United States Patent [19]

Monsour

[11] 4,357,915
[45] Nov. 9, 1982

[54] PROPELLER AND PISTON COMBINATION FOR INTERNAL COMBUSTION ENGINES

[76] Inventor: James R. Monsour, 10701 SW. 34th St., Miami, Fla. 33165

[21] Appl. No.: 206,189

[22] Filed: Nov. 12, 1980

[51] Int. Cl.³ .............................................. F02B 53/00
[52] U.S. Cl. .................................. 123/45 R; 123/307; 92/187
[58] Field of Search ................. 123/45, 193 P, 197 R, 123/197 A, 197 AB, 301, 306, 307; 92/173, 187, 31; 417/461, 500

[56] References Cited

U.S. PATENT DOCUMENTS

| | | | |
|---|---|---|---|
| 2,095,381 | 10/1937 | Donaldson | 123/45 R |
| 2,231,392 | 2/1941 | McCarthy | 123/307 |
| 2,410,565 | 11/1946 | Brockhurst | 123/45 R |
| 2,902,987 | 9/1959 | Schweitzer et al. | 123/45 R |

FOREIGN PATENT DOCUMENTS 132990  11/1978  German Democratic Rep. .. 123/45 R

*Primary Examiner*—Craig R. Feinberg

[57] ABSTRACT

This piston design serves to increase engine horsepower, and causes less friction, while simultaneously reducing fuel consumption. It consists primarily of a propeller-topped piston, secured, by its wrist pin, in a rotatable swivel member in the top of a connecting rod, that is secured to an engine crankshaft.

1 Claim, 6 Drawing Figures

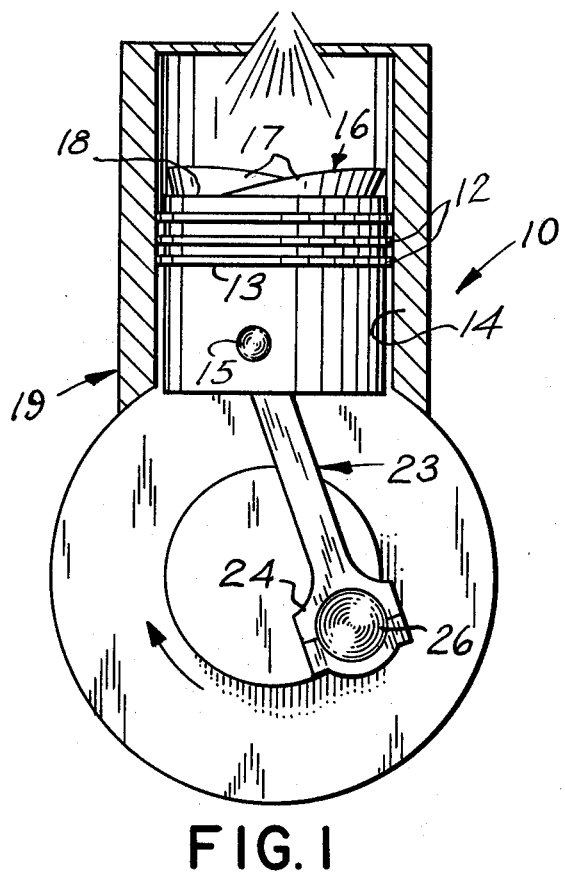
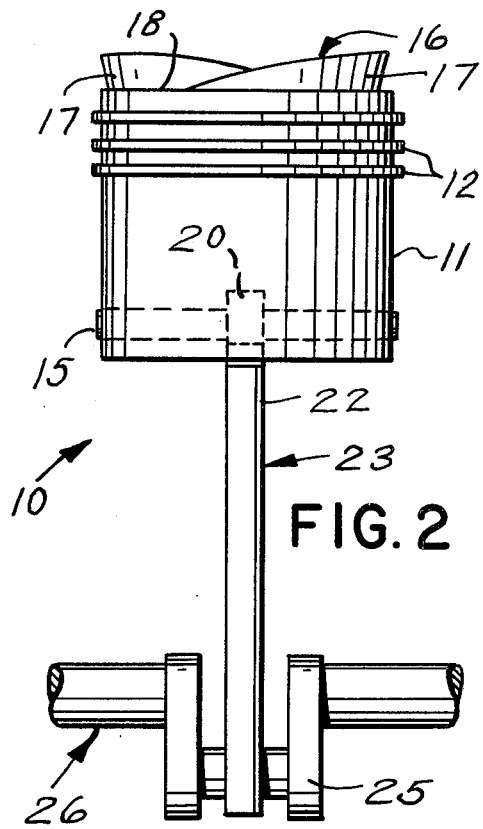
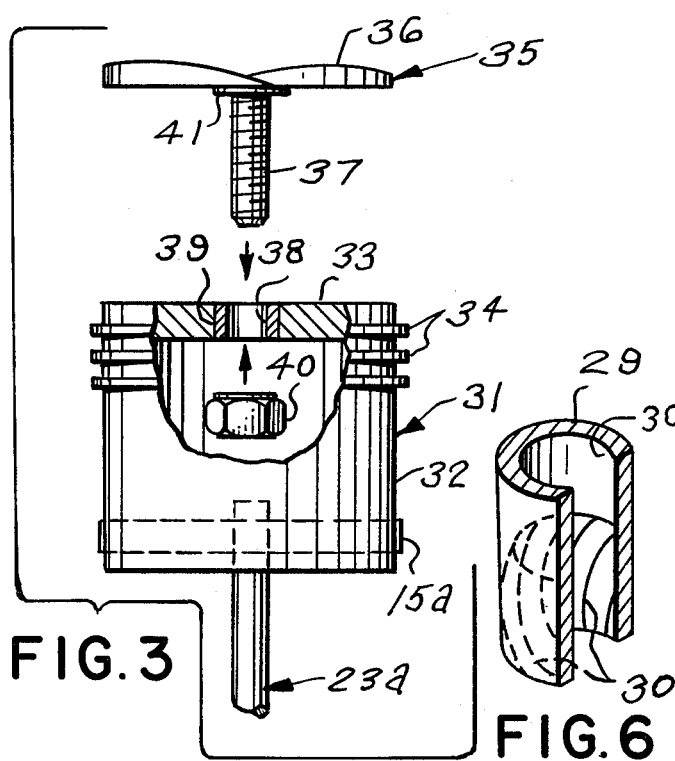
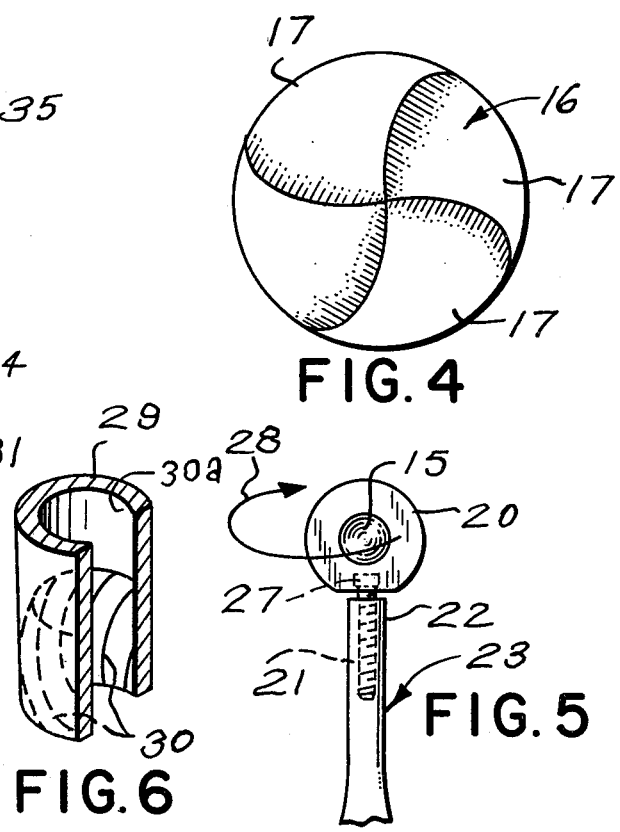

PROPELLER AND PISTON COMBINATION FOR INTERNAL COMBUSTION ENGINES

This invention relates to pistons for internal combustion engines, and more particularly, to a propeller-piston.

It is, therefore, the principal object of this invention to provide a propeller-piston, which will rotate in an internal combustion engine, on the power-stroke, so as to increase the volumetric efficiency of the engine, while enabling the engine to consume less fuel than engines of the prior art.

Another object of this invention is to provide a propeller-piston, which will cause less engine friction internally.

Another object of this invention is to provide a propeller-piston, which will enable an engine to run cooler, while simultaneously increasing its own power-stroke velocity in its cylinder, by the internal combustion of the fuel and air mixture being ignited.

A further object of this invention is to provide a propeller-piston, which will rotate on the end of its own connecting rod, which will cause a more even wear on the cylinder wall, in which the piston is located.

Other objects of the present invention are to provide a propeller and piston combination for internal combustion engines, which is simple in design, inexpensive to manufacture, rugged in construction, easy to use and efficient in operation.

These, and other objects, will be readily evident, upon a study of the following specification, and the accompanying drawing, wherein:

FIG. 1 is a side view of the present invention, shown in an internal combustion engine, that is illustrated fragmentary and in elevation;

FIG. 2 is an elevational side view of the engine crankshaft of FIG. 1, shown fragmentary, with the piston secured to it, and the cylinder removed therefrom;

FIG. 3 is an elevational and vertical view of a modified piston and rod combination, illustrating the connecting rod fragmentary, the piston partly broken away, and the propeller and mounting means separated from each other;

FIG. 4 is a top plan view of the propeller designs of both pistons shown in FIGS. 1, 2 and 3;

FIG. 5 is an enlarged elevational view of the connecting rod of FIGS. 1 and 2, showing the connecting rod fragmentary, and illustrating the rotatable swivel end and wrist pin, that secures the piston thereto, and FIG. 6 is a fragmentary perspective view of a modified form of cylinder for the pistons of FIGS. 1, 2 and 3.

According to this invention, a piston 10 is shown to include a cylindrical main body 11, having conventional rings 12 in their respective grooves 13. Piston 10 is oscillatable in cylinder 14, and is supported on wrist pin 15, in a manner known in the art. A propeller structure 16, consisting of blades 17, is integrally fabricated with the top wall 18 of piston 10, for being urged, in a circular fashion, by means of the hot expanding combustion gases on ignition in the cylinder 14.

A swivel member 20 freely receives wrist pin 15, of piston 10, through its center, and a pin 21 is force-fitted in the upper end 22 of connecting rod 23, which is journaled at its opposite end 24, on the throw 25 of crankshaft 26. The head 27 of pin 21 is freely rotatable in the bottom of swivel member 20, so as to enable piston 10 to rotate, as indicated by the arrow 28.

In operation, when piston 10 is at top dead-center, within cylinder 14 of engaging 19, after completion of the compression stroke, the ignition event takes place, and causes the fuel and air mixture to ignite, and the expanding hot gases will rotate the propeller structure 16 of piston 10, thus rotating piston 10 simultaneously on connecting rod 23 on the power stroke of piston 10, which will accelerate the downward travel of piston 10, to provide increased horsepower on less fuel, less engine friction, better cooling, and more even cylinder 14 wear.

Referring now to FIG. 6 of the drawing, a modified form of cylinder 29 is shown to have spiral grooving 30 on its inner periphery 30a, for better rotation guidance means of piston 10, without causing any blow-by of gases on the power stroke.

Looking now at FIG. 3 of the drawing, a modified form of piston 31 includes a cylindrical main body 32, having an end wall 33, and piston rings 34. A freely rotatable propeller 35, having a plurality of blades 36, includes an externally threaded shank 37, which is freely received in opening 38 of a suitable bearing 39, which is fixedly secured in the center of the end wall 33 of piston 31. A nut fastener 40 is received on shank 37, for rotatably securing propeller 35 to piston 31, and a shoulder flange 41, on shank 37, provides clearance means, for the blades 36, from end wall 33, for free rotation of propeller 35 with respect to the piston 31 wherein swivel member 20 would not be required.

It shall be recognized, that the principle of operation of piston 31 is similar to that of the heretofore described piston 10, with the exception, that only the propeller 35 rotates, and not the piston 31, on the power stroke.

While various changes may be made in the detail construction, it is understood that such changes will be within the spirit and scope of the present invention, as is defined by the appended claims.

What I now claim is:

1. A propeller piston for internal combustion engines, comprising, in combination, a plurality of equally spaced-apart vanes, integrally formed on an end wall of said piston, providing rotation means for said piston, on a power stroke of said piston in its cylinder, a wrist pin removably received transversely through said piston, and through a swivel member of a connecting rod secured to a crankshaft of an internal combustion engine, wherein said plurality of vanes are integral with said end wall of said piston, and are urged into rotation by expanding hot gases on the power stroke of said piston, and said wrist pin is freely received through an opening extending through side faces of said swivel member, and wherein said piston rotates simultaneously with said vanes, by means of said swivel member, and said swivel member consists of a pin fixedly secured in one end of the connecting rod of said piston, which is journaled on a crankshaft at its opposite end, and an extending head of said pin is freely and rotatably received in a correspondingly-shaped opening in a base portion of said swivel member.

* * * * *